United States Patent [19]

Hommel et al.

[11] 4,316,963

[45] Feb. 23, 1982

[54] LEADLESS GLAZE COMPOSITION MADE WITH ALKALINE EARTH MOLYBDENATE

[75] Inventors: Richard O. Hommel, Pittsburgh; David Klimas, Bridgeville, both of Pa.

[73] Assignee: The O. Hommel Company, Carnegie, Pa.

[21] Appl. No.: 232,162

[22] Filed: Feb. 6, 1981

[51] Int. Cl.³ .................... C03C 3/08; C03C 9/00; C03C 5/06
[52] U.S. Cl. ..................... 501/14; 428/428; 501/20; 501/21; 501/66; 501/67; 501/26
[58] Field of Search ............... 106/48, 312, 313, 45, 106/54; 428/428; 501/14, 20, 21, 26, 66, 67

[56] References Cited

U.S. PATENT DOCUMENTS

| | | | |
|---|---|---|---|
| 2,414,633 | 1/1947 | Bryant | 501/25 |
| 3,114,646 | 12/1963 | Currie | 106/48 |
| 3,278,324 | 10/1966 | Nelson | 106/48 X |
| 3,927,238 | 12/1975 | DiMarcello | 501/21 X |
| 4,084,976 | 4/1978 | Hinton | 501/26 |

*Primary Examiner*—Helen M. McCarthy
*Attorney, Agent, or Firm*—Webb, Burden, Robinson & Webb

[57] ABSTRACT

A leadless glaze composition having properties that make lead oxide containing glazes so widely used as ceramic glazes. The glazes according to this invention are prepared to analyze more than about 0.53 to about 1.5 weight percent molybdenum trioxide with the source of the molybdenum trioxide either in the frit or as a mill addition being alkaline earth molybdenate, for example, calcium molybdenate ($CaMoO_4$).

5 Claims, No Drawings

LEADLESS GLAZE COMPOSITION MADE WITH ALKALINE EARTH MOLYBDENATE

BACKGROUND

This invention enables the preparation of glazes without lead oxide additions but with the properties that make lead oxide glazes so desirable and widely used.

Glazes are thin silicate mixtures fused on the surfaces of ceramic bodies such as clay wares. They are glass-like in physical and chemical nature, thus they are hard, suitably insoluble (except in strong acids and bases) and impermeable to liquids. Like glasses, glazes are not definite chemical compounds but complex mixtures or solutions. Glaze compositions are known as either raw glazes or fritted glazes. Raw glazes are batched, possibly milled, and directly applied to the surface of the ceramic ware prior to firing (heating to a high temperature) to melt and fuse the glaze upon the ware which may or may not have been previously fired itself. Fritted glazes are glazes that are melted or fused, quenched, and milled prior to application to the ware. The advantages of the extra melting or fusing step are several including, for example, the ability to use water soluble ingredients, ingredients that may be harmful to contact if raw and ingredients that require additional lengths of time to fuse.

Lead oxide is an especially advantageous ingredient of glazes. It provides for excellent gloss, smooth surfaces and transparency. Lead oxide is a low temperature flux reacting readily with silica, alumina, and other glaze ingredients. It forms melts of low viscosity. Enclosed bubbles are more easily released by lead oxide glazes. Blisters and defects are more easily healed and obscured. Lead oxide glazes tend to have a favorable viscosity lengthening the firing range thus reducing the risk of overfiring. The higher contact of alkali necessary to produce the desired fusibility in the absence of lead oxide tends to raise the thermal coefficient of expansion thereby promoting crazing. Any attempt to produce similar desirable properties without the use of lead has proved to be a difficult technical problem. See *Ceramic Glazes* by Cullen W. Parmelee (Second Edition, 1951).

Lead glazes are not without drawbacks; for example, improper handling of lead containing raw materials can comprise a health hazard. Further, improperly compounded lead containing glazes when in long contact with food (fruit and vegetable juices) can result in the food becoming unsafe for use.

While molybdenum (as an oxide) has been considered for use in special ceramic glazes in order to provide flowability and wettability, it has not been widely used. In U.S. Pat. No. 3,927,238, it is taught that amounts of $MoO_3$ above 0.5 percent reduces its effectiveness.

The applicants have discovered that the small quantities of alkaine earth molybdenates may be suitably used in lead-free glazes either as a frit addition or as a mill addition to produce glazes having the properties of lead oxide containing glazes.

SUMMARY OF THE INVENTION

Briefly according to this invention, there is provided a method of preparing a fritted leadless glaze composition comprising a first step of batching a raw glaze composition including sources of silica, boric acid, alumina, alkaline earth oxides and alkaline metal oxides and alkaline earth molybdenates, a second step of fritting the batch and a third step of milling the frit to provide glaze compositions suitable for application to ceramic ware.

A preferable alkaline earth molybdenate is calcium molybdenate ($CaMoO_4$). More than about 0.53% by weight of the glaze composition should comprise $MoO_3$. Less than about 1.5 weight percent $MoO_3$ is required to produce the desirable glaze properties. Superior results have been achieved between more than about 0.53 and about 1.0 weight percent $MoO_3$.

In yet another embodiment of this invention, a method of preparing a partially fritted leadless glaze composition comprises a first step of batching a raw glaze composition including sources of silica, boric acid, alumina, alkaline earth oxides, alkaline oxides, a second step of fritting the batch and a third step of milling the frit with alkaline earth molybdenates as a mill addition.

Calcium molybdenate ($CaMoO_4$) has been found to be particularly suitable for the purposes of this invention. Nevertheless, this invention contemplates the use of barium molybdenate ($BaMoO_4$) and strontium molybdenate ($SrMoO_4$).

DESCRIPTION OF PREFERRED EMBODIMENTS

EXAMPLE I

The following glaze composition was prepared and tested both in the laboratory and in production giving properties equal, if not superior, to lead containing glazes. The frit composition set forth in the following table is in the "Empirical Formula" format. The numbers before the chemical formulas for oxides are molecular proportions. As is usually the case, the "RO" or base oxides total one part.

| | FRIT E | |
|---|---|---|
| RO | $R_2O_3$ | $RO_2$ |
| .005 $K_2O$ | | |
| .191 $Na_2O$ | .291 $Al_2O_3$ | 2.97 $SiO_2$ |
| .402 CaO | .359 $B_2O_3$ | .025 $MoO_3$ |
| .402 BaO | | |

The frit analyzed as follows:

| | |
|---|---|
| $K_2O$ | .15 |
| $Na_2O$ | 3.81 |
| CaO | 7.25 |
| BaO | 19.82 |
| $Al_2O_3$ | 6.26 |
| $B_2O_3$ | 8.03 |
| $SiO_2$ | 53.52 |
| $MoO_3$ | 1.16 |

The source for the $MoO_3$ in the frit was calcium molybdenate ($CaMoO_4$). The glaze consisted of 92.3% frit and 7.7% clay.

This glaze composition has been run in a production test on a semi-vitreous body (flint-clay-feldspar type) producing an excellent surface. The composition was fired in a commercial tunnel kiln at Cone 5. This glaze has also been tested on vitreous china, giving excellent surface but crazing, due to its high expansion. The crazing could be eliminated by changing the glaze composition to lower the glaze expansion.

Glazes using the common oxides used in glaze development such as $K_2O$, $Na_2O$, $Li_2O$, CaO, MgO, BaO, SrO, ZnO, $Al_2O_3$, $B_2O_3$, $SiO_2$, $ZrO_2$ may be formulated according to this invention by the addition of calcium molybdenate. The physical and chemical characteristics of each glaze formulation will be dependent upon how much and what proportions of the various oxides are used in the glaze.

Typical compositional ranges for the remaining frit or glaze ingredients might comprise:

| | |
|---|---|
| $Li_2O$ | 0-3.5% |
| $Na_2O$ | 0-9 |
| $K_2O$ | 0-9 |
| CaO | 3-11 |
| BaO | 0-25 |
| SrO | 0-25 |
| ZnO | 0-14 |
| MgO | 0-6 |
| $Al_2O_3$ | 3-13 |
| $B_2O_3$ | 5.0-18 |
| $SiO_2$ | 40-60 |

Glazes similar to that described above have been successfully prepared using $Li_2O$, $SrO_2$, and MgO as oxide ingredients. The $B_2O_3$ content of the above described glaze may be increased to extend the firing range. To make the glaze behave similar to a commercially accepted lead glaze, the glaze must be fluid enough to heal defects and produce a smooth surface. This is usually done by increasing the $B_2O_3$ content to a percentage where the glaze would not produce a good surface unless it contained lead at a minimum percentage to obtain a good surface or as this work shows an addition of $MoO_3$ can also do. If the $MoO_3$ is added to a glaze which has a suitable surface without the addition, this glaze is most likely very viscous in composition and would not be accepted commercially.

From more than about 0.53 to less than about 1.5 weight percent $MoO_3$ in the glazes supplied as alkaline earth molybdenate provides satisfactory results. Tests in the laboratory show some type of crystallization appearing on the surface of the glaze at about 1.2% $MoO_3$. Superior results have been achieved from more than about 0.53 to about 1.0 weight percent $MoO_3$. The fired glaze appearance is dependent upon the overall glaze composition and firing conditions.

EXAMPLE II

Another frit composition was prepared analyzing as follows:

| FRIT D | |
|---|---|
| $K_2O$ | .15 |
| $Na_2O$ | 3.83 |
| CaO | 7.29 |
| BaO | 19.94 |
| $Al_2O_3$ | 6.29 |
| $B_2O_3$ | 8.08 |
| $SiO_2$ | 53.83 |
| $MoO_3$ | .58 |

The source of the $MoO_3$ in the frit was calcium molybdenate. Generally speaking, Frit D differs from Frit E in comprising less $MoO_3$ and proportionately more of the remaining ingredients.

The following glaze was prepared:

| | |
|---|---|
| 92.0% | Frit D |
| 8.0% | Clay |

The weight percent $MoO_3$ in the glaze was 0.53. The glaze composition of this example was tested on a bisqued semi-vitreous body (flint-clay-feldspar type) and was fired in a commercial tunnel kiln at Cone 5. The following results were reported: The surface of the glaze was not glossy because of many small pinholes. Blisters also occurred.

EXAMPLE III

The following glaze was prepared:

| | |
|---|---|
| 64.4% | Frit D |
| 27.6% | Frit E |
| 8.0% | Clay |

The weight percent $MoO_3$ in the glaze was 0.69. The glaze of this example was tested in the same way as those of Examples I and II. The following results were reported: Good surface but some small blisters. Increasing the $MoO_3$ weight percent from 0.53 to 0.69 resulted in a decided improvement in glaze properties. From comparison of the results of Examples II and III it was concluded that it is very unlikely that workable compositions could be prepared with less than about 0.53 percent $MoO_3$.

EXAMPLE IV

The following glaze was prepared:

| | |
|---|---|
| 36.8% | Frit D |
| 55.2% | Frit E |
| 8.0% | Clay |

The weight percent $MoO_3$ in the glaze according to this example was 0.85. The glaze composition was tested in the same way as the prior examples. The following results were reported: Very good surface but one or two small blisters observed.

EXAMPLE V

The following glaze was prepared:

| | |
|---|---|
| 27.6% | Frit D |
| 64.4% | Frit E |
| 8.0% | Clay |

The weight percent $MoO_3$ was 0.9. The glaze composition was tested as in the above examples. The following results were observed: Excellent surface with no blisters.

Comparing all the examples, it is concluded that optimum results are obtained with about 1% $MoO_3$.

Where this invention is practiced in the use of an unfritted or only partially fritted glaze composition, the molybdenum trioxide may be added to the batch as a mill addition in the form of calcium molybdenate without effecting the rheology of the glaze slurry. When molybdenum trioxide is added to a clay suspended glaze there is a tendency for the viscosity of the glaze slurry to increase considerably. This is due, perhaps, to the fact that molybdenum trioxide is readily in alkali solutions and with metal oxides to form molybdenates and/or polymolybdenates. Moreover, applicants were not even able to produce a suitable frit using $MoO_3$ as a raw material.

Alkaline earth molybdenates, in particular calcium molybdenate ($CaMoO_4$) is advantageous in fully fritted glaze compositions as a source of molybdenum trioxide as during the high temperature required in fritting and glaze firing most of the molybdenum trioxide will be retained in the frit or glaze. Theoretically speaking, the molybdenum trioxide melts at about 800° C. and calcium molybdenate does not decompose until about 965° C. Other alkaline earth molybdenates decompose or melt at even higher temperatures. This may supply a partial explanation of the advantageous way in which alkaline earth molybdenates more efficiently supply molybdenum trioxide to fritted glaze compositions.

The details of converting the "Empirical Formula" of the frit to batch formulas and the available raw materials as the oxide sources is well known to ceramic scientists. It is explained, for example, in Chapter III of *Ceramic Glazes* by Parmelee. Further, the process steps of mixing, fritting, milling with mill additions, application to ceramic ware and firing are also well understood to ceramic scientists as further explained in the above referenced text.

All percentages of oxides set forth herein are weight percentages unless otherwise stated.

Having thus described the invention with the detail and particularity required by the Patent Laws, what is desired protected by Letters Patent is set forth in the following claims:

1. A method of preparing a leadless glaze composition comprising the steps of:
   a. batching a raw glaze composition including sources of silica, boric acid, alumina, alkaline earth oxides, alkali metal oxides, and alkaline earth molybdenate as the source of $MoO_3$ in the batch,
   b. fritting the batch, and
   c. milling the fritted batch.
2. The method according to claim 1 wherein the alkaline earth molybdenate is calcium molybdenate.
3. The method according to claim 1 wherein the fritted batch analyzes by weight percent:

| | |
|---|---|
| $LiO_2$ | 0–3.5 |
| $Na_2O$ | 0–9 |
| $K_2O$ | 0–9 |
| CaO | 3–11 |
| BaO | 0–25 |
| SrO | 0–25 |
| ZnO | 0–14 |
| MgO | 0–6 |
| $Al_2O_3$ | 3–13 |
| $B_2O_3$ | 5–18 |
| $SiO_2$ | 40–60 |
| $MoO_3$ | 0.53–1.5 |

4. A leadless glaze frit composition analyzing silica, alumina, boric acid, alkaline earth oxides, alkali oxides and more than about 0.53 and up to about 1.5 percent by weight $MoO_3$ prepared from a raw batch in which the $MoO_3$ is supplied as an alkaline earth molybdenate such that the glaze frit has properties similar to lead containing glaze frits.

5. A glaze frit composition analyzing by weight percent:

| | |
|---|---|
| $LiO_2$ | 0–3.5 |
| $Na_2O$ | 0–9 |
| $K_2O$ | 0–9 |
| CaO | 3–11 |
| BaO | 0–25 |
| SrO | 0–25 |
| ZnO | 0–14 |
| MgO | 0–6 |
| $Al_2O_3$ | 3–13 |
| $B_2O_3$ | 5–18 |
| $SiO_2$ | 40–60 |
| $MoO_3$ | 0.53–1.50 | in which the $MoO_3$ is supplied to the frit batch as calcium molybdenate.

* * * * *

UNITED STATES PATENT AND TRADEMARK OFFICE
CERTIFICATE OF CORRECTION

PATENT NO. : 4,316,963
DATED : February 23, 1982
INVENTOR(S) : Richard O. Hommel et al.

It is certified that error appears in the above-identified patent and that said Letters Patent are hereby corrected as shown below:

Column 4 Line 64 After "readily" insert --reactive--.

Signed and Sealed this

Eighteenth Day of May 1982

[SEAL]

Attest:

Attesting Officer

GERALD J. MOSSINGHOFF

Commissioner of Patents and Trademarks